United States Patent [19]

Kaneko et al.

[11] Patent Number: 5,322,773
[45] Date of Patent: Jun. 21, 1994

[54] SELECTIVE ENZYMATIC DEGRADATION OF β-LACTOGLOBULIN CONTAINED IN COW'S MILK-SERUM PROTEIN

[75] Inventors: Tetsuo Kaneko, Saitama; Tadashi Kojima, Tokyo; Tamotsu Kuwata, Saitama; Yoshiro Yamamoto, Tokyo, all of Japan

[73] Assignee: Meiji Milk Products Co., Ltd., Tokyo, Japan

[21] Appl. No.: 49,664

[22] Filed: Apr. 21, 1993

Related U.S. Application Data

[60] Continuation of Ser. No. 546,265, Jun. 29, 1990, abandoned, which is a division of Ser. No. 379,295, Jul. 13, 1989, Pat. No. 5,135,869.

[30] Foreign Application Priority Data

Jul. 20, 1988 [JP] Japan ............................ 63-179149
Jun. 22, 1989 [JP] Japan ............................ 1-158252

[51] Int. Cl.$^5$ ............ C12P 21/00; C12N 9/50; C12N 9/56; C12N 9/62; C12N 9/58; A23C 9/12
[52] U.S. Cl. ................ 435/68.1; 435/219; 435/222; 435/225; 435/223; 426/34; 426/42
[58] Field of Search ............ 435/68.1, 262, 267, 435/272, 268, 219, 222, 225, 223; 426/583, 34, 42

[56] References Cited

U.S. PATENT DOCUMENTS

| | | | |
|---|---|---|---|
| 4,427,658 | 1/1984 | Maubois et al. | 435/68.1 |
| 4,847,096 | 7/1989 | Mellqvist et al. | 435/68.1 |
| 4,918,008 | 4/1990 | Gauri | 435/68.1 |

FOREIGN PATENT DOCUMENTS

| | | |
|---|---|---|
| 0022019 | 1/1981 | European Pat. Off. |
| 0087247 | 8/1983 | European Pat. Off. |
| 0321603 | 6/1989 | European Pat. Off. |
| 62-171644 | 7/1987 | Japan |

OTHER PUBLICATIONS

McGraw-Hill Dictionary of Scientific and Technical Terms, 4th edition, p. 1361.
Kuwata et al, "Purification of Whey of Concentrated Whey Protein", (1984) abstract only.
Kaneko et al, "Method of Purifying Whey of Whey Protein Concentrate", (1987) abstract only.
Chihara et al, "Production of Modified Whey Protein Concentrate", (1987) abstract only.
Kashiwara et al, "Nutritious Agent Containing Milk Protein Hydrolyzate as Active Ingredient", (1988) abstract only.
Morinaga Milk, "Protein decomposition product preparation" (1977) abstract only.
Otani et al.—Chem. Abst. vol. 105 (1986) p. 40,961g.
Otani et al.—Chem. Abst. vol. 105 (1986) p. 20693t.
Otani et al.—Chem. Abst. vol. 94 (1981) p. 101246f.
Otani et al.—Chem. Abst. vol. 104 (1986) p. 202556n.
Journal of Food Science, vol. 53, No. 4 (1988) pp. 1208-1211, "Immunogenicity and Allergenicity of Whey Protein Hydrolysates" J. Asselin et al.
Derwent Publications, Ltd. No. 88-128952(19), (1988)GBK; & JP-A-63 071 197, "Abstract" Toyobo Co., Ltd.
Patent Abstracts of Japan, vol. 10, No. 276 (C-373) (2332), (Sep. 1986) "Production of Whey Protein having Improved Forming Stability", Snow Brand Milk Prod. Co. Ltd.
McKellar—Chem. Abst. vol. 96 (1982) p. 18808m.

Primary Examiner—Douglas W. Robinson
Assistant Examiner—Susan M. Dadio
Attorney, Agent, or Firm—Browdy and Neimark

[57] ABSTRACT

This invention relates to a method of selectively degrading β-lactoglobulin contained in cow's milk-serum protein by using a specific enzyme capable of selectively degrading β-lactoglobulin.

5 Claims, 9 Drawing Sheets

FIG. 1

REACTION : 37°C × 4 HOURS

| α-La | β-Lg | BSA Lf Ig | |
|---|---|---|---|
| ● | ● | ·ⅠⅠⅠ | STANDARD PROTEIN MIXTURE |
|  | ● | ● ·( | TREATED WITH PEPSIN (pH2) |
| ● | Ⅰ Ⅰ | ⅠⅠ | TREATED WITH TRYPSIN (pH7.5) |
| ● | ⅠⅠ | ⅠⅠ | TREATED WITH α-CHYMOTRYPSIN (pH7.5) |
| ● | ● | ⅠⅠⅠⅠ | TREATED WITH PANCREATIN (pH7.5) |
| ● |  | ⅠⅠⅠⅠ | TREATED WITH AMANO A* (pH7.5) |
|  |  | Ⅰ | TREATED WITH PEPSIN (1hr) →TRYPSIN (pH2→7.5) |
|  |  |  | TREATED WITH PEPSIN (1hr) →α-CHYMOTRYPSIN (pH2→7.5) |
|  | ● Ⅰ |  | TREATED WITH PEPSIN (1hr) →PANCREATIN (pH2→7.5) |
|  |  |  | TREATED WITH PEPSIN (1hr) →AMANO A (pH2→7.5) |
| ● | ● | ⅠⅠⅠⅠ | UNREACTED MILK-SERUM PROTEIN |

*NEUTRAL PROTEASE DERIVED FROM A FILAMENTOUS FUNGUS OF ASPERGILLUS

NEUTRALIZATION PCA METHOD USING
MOUSE ANTI-α-La SERUM

NEUTRALIZATION PCA METHOD USING
MOUSE ANTI-β-Lg SERUM

1/10
1/20
1/40
1/80

SELECTIVE ENZYMATIC DEGRADATION OF β-LACTOGLOBULIN CONTAINED IN COW'S MILK-SERUM PROTEIN

This application is a continuation of co-pending application Ser. No. 07/546,265, filed Jun. 29, 1990, now abandoned, which is a divisional application of co-pending application Ser. No. 07/379,295, filed Jul. 13, 1989, now U.S. Pat. No. 5,135,869.

FIELD OF THE INVENTION

This invention relates to selective enzymatic degradation of β-lactoglobulin contained in cow's milk-serum protein.

More particularly, it relates to a method of selectively degrading β-lactoglobulin contained in cow's milk-serum protein by using a specific enzyme capable of selectively degrading β-lactoglobulin.

β-Lactoglobulin (hereinafter abbreviated as β-Lg), which is scarcely found in human milk, often acts as a powerful allergen to infants.

The cow's milk-serum protein which is freed from β-Lg by the method of this invention can be used as a protein source for the preparation of infant-nursing foods having a low allergenic action.

PRIOR ART

In the manufacture of powdered milk preparations for infant nursing, efforts are generally made to make the protein composition of cow's milk as similar as possible to that of human milk.

The greatest difference between cow's milk and human milk is that β-Lg which is contained in a large amount in the former is scarcely found in the latter.

In order to make the protein composition of cow's milk similar to that of human milk, a method has been adopted in which part of casein is replaced by milk serum. This method, however, has brought about no substantial improvement, because other components not found in human milk become incorporated and the absolute amount of β-Lg cannot be diminished.

Also proposed were a method in which ferric chloride in an amount in a specific range is added to milk serum or its protein concentrate at a pH and a temperature in specific ranges, thereby isolating milk-serum protein with diminished β-Lg as precipitate (Japanese Patent Kokai No. 113848/1984); a method in which milk serum or its protein concentrate is treated with ferric chloride in an amount in a specific range different from the above at a pH and a temperature in specific ranges different from the above, thereby isolating protein with diminished β-Lg as supernatant (Japanese Patent Kokai No. 268131/1986); and a method in which milk serum or its protein concentrate is desalted, adjusted to a pH in a specific range and heated at a temperature in a specific range, thereby isolating protein with diminished β-Lg as precipitate (Japanese Patent Kokai No. 268138/1986).

The above-mentioned precipitation methods with ferric chloride are of little utility because milk-serum protein contains β-Lg in an amount as large as about 50% and hence the other types of protein components are also removed by the precipitation in considerable quantities.

On the other hand, the method of removing β-Lg as soluble fraction by heating milk serum or its protein concentrate after desalting has the problem that non-protein nitrogenous compounds which are important nutrients, such as urea and glycomacropeptides, are also lost.

As techniques to diminish allergen by treatment with a protease, have been proposed a method in which a mixture of disrupted cells of a lactic acid bacterium, pancreatin and a protease obtained from a filamentous fungus belonging to the genus Aspergillus is allowed to act upon milk protein at a temperature in a specific range, and the reaction is terminated when a predetermined amount of amino compounds are released, thus giving protein degradation products free from antigens (Japanese Patent Kokai No. 36235/1979); and a method in which pancreatin and a protease derived from a microorganism belonging to the genus Bacillus are allowed to act upon milk protein, thereby giving milk protein degradation products which are free from antigens and are readily soluble in water (Japanese Patent Kokai No. 171644/1987).

These methods have the problems that, because all the protein is degraded into amino acids or oligopeptides, the final product has diagreeable taste and bitterness unique to the degradation products, thus lowering its value as food, and lacks the important functions as protein.

PROBLEMS TO BE SOLVED BY THE INVENTION

The object of this invention is to establish a method of selectively degrading β-Lg contained in milk-serum protein in an amount as large as about 50%, thereby providing an allergen-free food material for nursing infants.

BRIEF DESCRIPTION OF THE DRAWINGS

FIG. 9: reaction mixture).

---

α-La: α-Lactalbumin, β-Lg: β-Lactoglobulin,
BSA: Bovine serum albumin, Lf: Lactoferrine,
Ig: Immunoglobulin

---

MEANS TO SOLVE THE PROBLEMS

Intensive studies in search of a new enzymatic method for selectively degrading β-Lg in cow's milk-serum protein have led us to discover that this object can be achieved by using, under specific conditions, a protease of microbial origin, such as proteases derived from filamentous fungi belonging to the genus Aspergillus, those derived from *Bacillus subtilis* and those derived from actinomyces, or a protease of animal origin, such as trypsin and α-chymotrypsin.

A method of degrading milk-serum protein by using a protease derived from a filamentous fungus belonging to the genus Aspergillus is already known (Japanese Patent Publication No. 36235/1979). However, few examples are known in which ease of degradation for individual components in the milk-serum protein system is closely investigated, and there is no example at all in which only β-Lg is selectively degraded by specific proteases.

In the method of this invention, a protease derived from a filamentous fungus belonging to the genus Aspergillus, a protease derived from *Bacillus subtilis*, a protease derived from *Streptomyces griseus*, trypsin or α-chymotrypsin is added to an aqueous solution of cow's milk-serum protein, and the mixture is held at a pH in the range of 7 to 9 and a temperature in the range of 30° to 40° C. for 0.5 to 20 hours. This proteolytic treatment should be continued until amino compounds soluble in 10% trichloroacetic acid (hereinafter abbreviated as 10%-TCA) are released in an amount corresponding to 220 mg glycine per gram of substrate protein when the protease derived from a filamentous fungus of Aspergillus, *Bacillus subtilis* or *Streptomyces griseus* is used, and in an amount corresponding to 120 mg glycine when trypsin or α-chymotrypsin is used.

The selective degradation of β-Lg contained in milk-serum protein is unique action of the protease derived from a filamentous fungus of Aspergillus, the protease derived from *Bacillus subtilus*, the protease derived from *Streptomyces griseus*, trypsin and α-chymotrypsin, and is not observed with the other proteases showing the highest activity in the acidic region.

The SDS-polyacrylamide gel electrophoresis used in the method of this invention is the Laemmli's modification (Laemmli, U.K., 1970, Cleavage of Structural Proteins during the Assembly of the Head of Bacteriophage T4, Nature, 227:680). Its operating conditions are as shown below.

1. Gel composition (gel thickness: 1 mm)
   1-1. Concentrating gel
       Acrylamide concentration: 4%
       Bisacrylamide:Acrylamide = 1:10
       Gel buffer: 0.125M Tris-HCl buffer containing
       0.1% sodium dodecyl sulfate and 6M urea (pH 6.8)
       TEMED concentration: 0.125%
       Ammonium persulfate concentration: 0.3 mg/ml
   1-2. Separating gel
       Acrylamide concentration: 15%
       Bisacrylamide:Acrylamide = 1:37
       Gel buffer: 0.375M Tris-HCl buffer containing
       0.1% sodium dodecyl sulfate and 6M urea (pH 8.9)
       TEMED concentration: 0.125%
       Ammonium persulfate concentration: 0.3 mg/ml
2. Migration buffer (pH 8.3)

| Sodium dodecyl sulfate | 1 g/l |
| --- | --- |
| Tris | 3 g/l |
| Glycine | 14.4 g/l |

3. Staining solution

| Coomassie Brilliant Blue | 2 g/l |
| --- | --- |
| Acetic acid | 92 ml/l |
| Methanol | 454 ml/l |

4. Decolorizing solution

| Acetic acid | 75 ml/l |
| --- | --- |
| Methanol | 250 ml/l |

5. Preparation of samples for electrophoresis
   A mixture of 1 ml sample solution (e.g., enzyme-treated 1%-WPI) and 1 ml of 20% trichloroacetic acid was allowed to stand at room temperature for 30 minutes and then centrifuged (1500 g, 30 minutes), the separated precipitate was dissolved in 1 ml of 0.5M Tris-HCl buffer containing 2% SDS and 6M urea (pH 8.0), this solution was boiled for two minutes, 1 ml of 0.05% Bromophenol Blue was added, and 10 μl of the solution thus prepared was used as a sample for electrophoresis.

Figure 1:
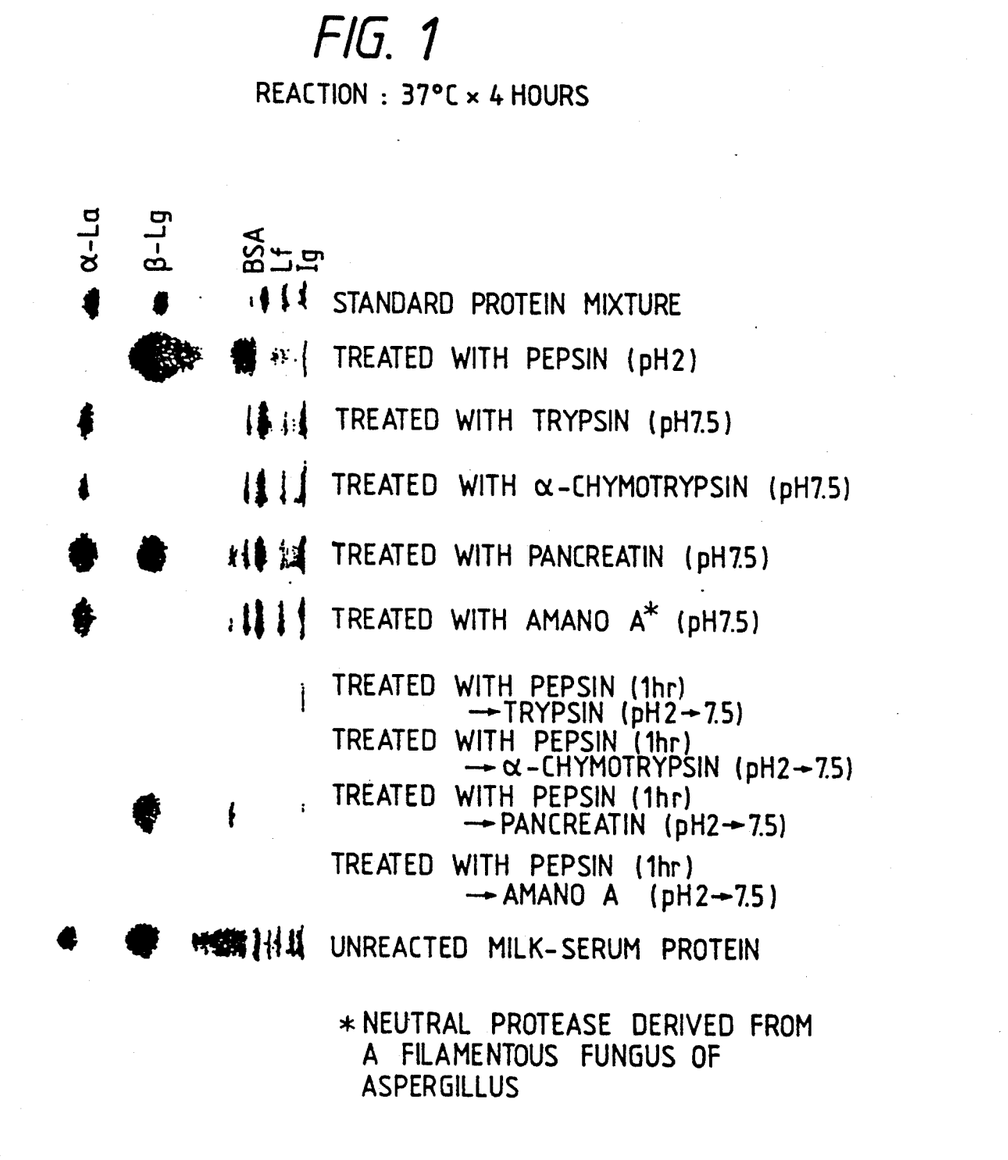
FIG. 1 shows SDS-polyacrylamide gel electrophoretic patterns of milk-serum protein degraded by commerical proteases.

FIG. 1 shows SDS-polyacrylamide gel electrophoresis patterns of milk-serum protein degraded by commercial proteases.

These patterns are the results of treatment with pepsin, trypsin, α-chymotrypsin, pancreatin, Amano A (a protease derived from a filamnetous fungus belonging to the genus Aspergillus; Amano Pharmaceutical Co., Ltd.), and combinations of pepsin with the above proteases at 37° C. for four hours at respective optimal pH levels. The figure indicates that selective degradation of β-Lg can be effected by treatment with Amano A, as well as trypsin and α-chymotrypsin. It was also found that the effective action of these proteases is nullified when the sample is pretreated with pepsin.

Figure 2:
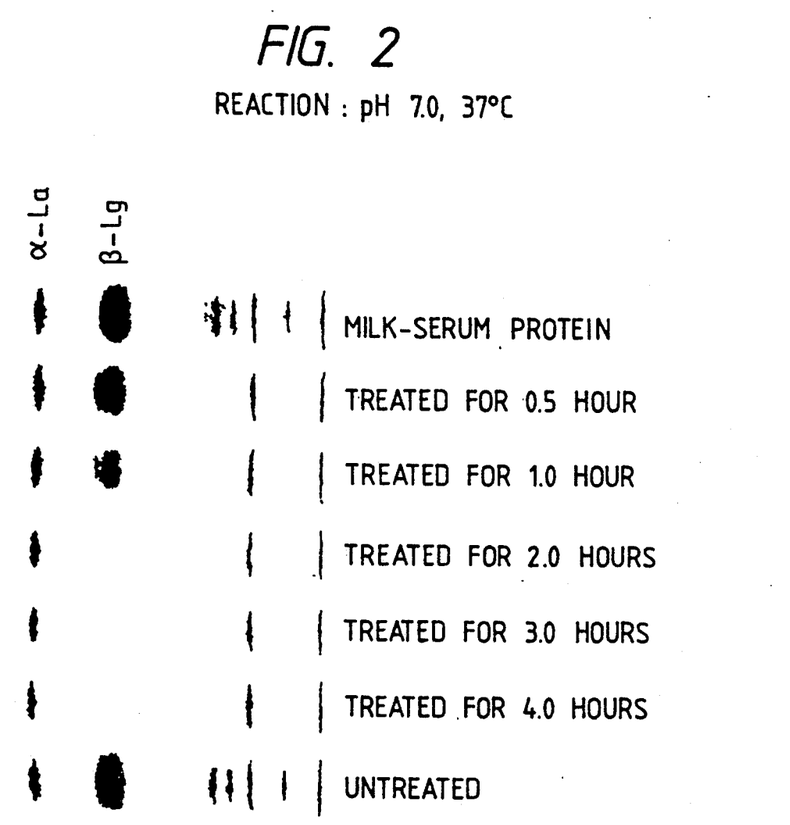
FIG. 2 shows SDS-polyacrylamide gel electrophoretic patterns of milk-serum protein treated with Neutrase (neutral protease derived from *Bacillus subtilis*).

FIG. 2 shows SDS-polyacrylamide gel electrophoretic patterns of milk-serum protein treated with Neutrase (a protease derived from *Bacillus sutilis*; Novo Inc.) at 35° C. for four hours at pH 7.0. This clearly indicates that this protease also has the action of selectively degrading β-Lg.

Figure 3:
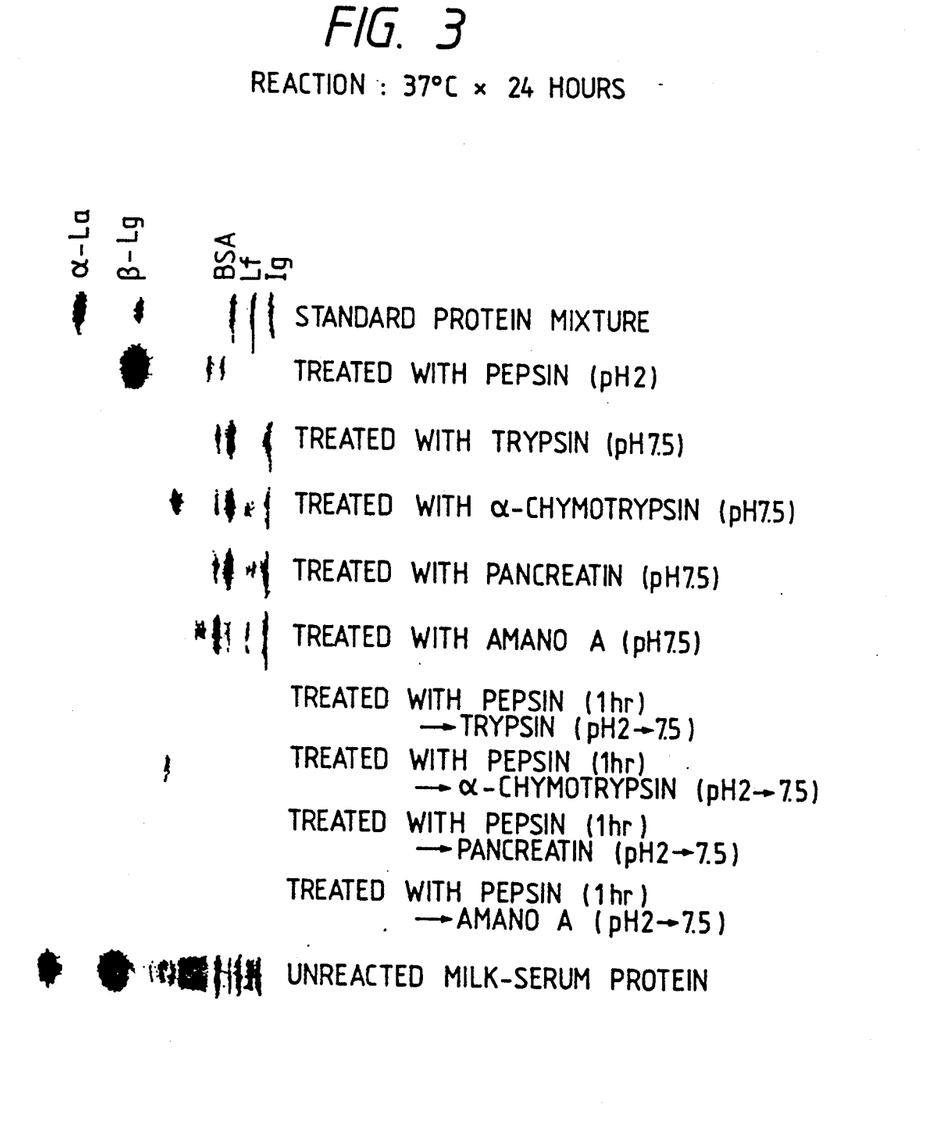
FIG. 3 shows SDS-polyacrylamide gel electrophoretic patterns after the enzymatic reactions of FIG. 1 are continued for 24 hours.

FIG. 3 shows SDS-polyacrylamide gel electrophoretic patterns after the enzymatic reactions of FIG. 1 are continued for 24 hours. This indicates that the action of selectively degrading β-Lg is lost when the reaction time is extended to 24 hours.

Figure 4:
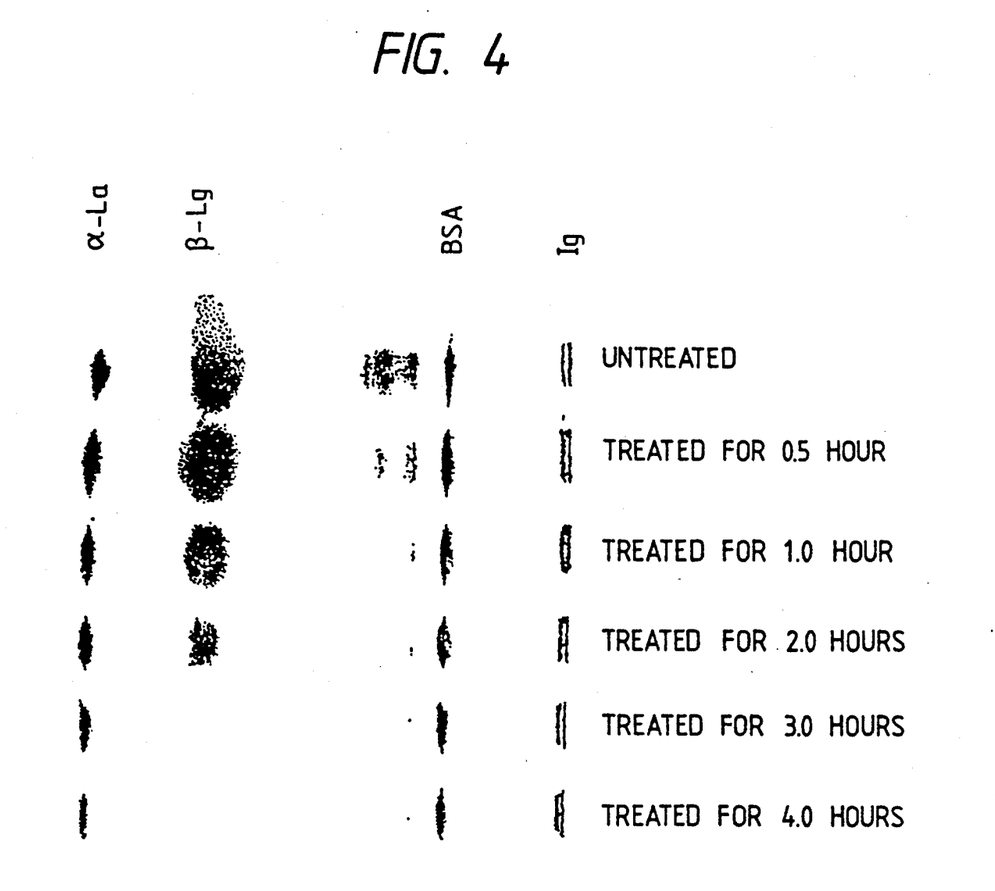
FIG. 4 shows SDS-polyacrylamide gel electrophoretic patterns of milk-serum protein treated with a protease derived from *Streptomyces griseus*.

FIG. 4 shows SDS-polyacrylamide gel electrophoretic patterns of milk-serum protein treated with a protease derived from *Streptomyces griseus*. This indicates that β-Lg can be selectively degraded when the reaction is continued for three hours.

These experiments show that treatment with an effective enzyme for a short time is essential to selective degradation of β-Lg.

In addition, the proteolytic treatment should preferably be carried out at a pH in the range of 7 to 9 and at a temperature in the range of 30° to 40° C. to ensure satisfactory selective degradation. Degradation of β-Lg scarecely proceeds at a pH lower than 7, and degradation of milk-serum protein components other than β-Lg takes place at a pH lower than 5. When the pH exceeds 9, on the other hand, selective degradation of β-Lg cannot be expected. A reaction temperature lower than 30° C. is unsuitable for industrial application because the rate of β-Lg degradation is significantly low, while a temperature higher than 40° C. is not preferable because selective degradation of β-Lg cannot be expected.

Generally speaking, the reaction time required to obtain an intended degradation product depends on the potency of the enzyme used; the higher the potency, the shorter the reaction time, and vice versa. The unit of enzyme potency varies with the enzyme manufacturer, and even the same type of enzymes produced by a manufacturer do not always show the same potency. Hence, when enzymatic reactions are controlled by reaction time, it is necessary to use enzymes of unified potency. When using enzymes of different manufacturers, however, it is difficult to control the reactions by reaction time because of the different potency units adopted.

In practicing the method of this invention, it is preferable to determine the proper reaction time based on the amount of a degradation product released in order to avoid the influence of such variations in the enzyme potency.

When glycine is taken as the standard substance for the amino compounds soluble in 10%-TCA released by degradation of milk-serum protein in SDS-polyacrylamide gel electrophoresis, the amount of formed glycine reaches 220 mg and 120 mg per gram of substrate protein (for Amano A, and a combination of trypsin and α-chymotrypsin, respectively) after four hours of reaction time when β-Lg is completely degraded. Degradation to about this extent maintained until a reaction time of six hours.

Twenty-four hours after the start of reaction when the action of selectively degrading β-Lg is lost, amino compounds are released in an amount corresponding to 400 mg and 170 mg glycine (for Amano A, and trypsin or α-chymotrypsin, respectively).

When bovine trypsin (T-8003, Sigma Inc.) is used as the protease, almost all β-Lg is degraded after 30 minutes by the reaction at 37° C. and at pH 8.0

In the method of this invention, a protease derived from a filamentous fungus of Aspergillus (typified by Amano A), a protease derived from *Bacillus subtilus*, a protease derived from *Streptomyces griseus*, trypsin and α-chymotrypsin may all be used as an effective enzyme for selective degradation of β-Lg contained in cow's milk-serum protein.

In general, the enzymatic reaction should be continued for 0.5 to 20 hours at a temperature in the range of 30 to 40° C. and at a pH in the range of 7 to 9.

It is necessary to trace the progress of enzymatic reaction (degradation of β-Lg) by measuring, using glycine as the standard substance, the amount of amino compounds soluble in 10%-TCA released by the reaction and to terminate it when the amount reaches a predetermined level. This level may vary with the type of protease used: about 220 mg per gram of substrate protein for Amano A and proteases derived from *Bacillus subtilis*, and about 120 mg for trypsin or α-chymotrypsin.

Described below are Examples of this invention.

EXAMPLE 1

Five liters of 1 wt % aqueous solution of isolated cow's milk-serum protein was adjusted to pH 7.5 by addition of 1N sodium hydroxide and put into a steam-sterilized jar fermentor (net capacity: 5 liters) through a large germfree filter. Separately, Amano A (a neutral protease derived from a filamentous fungus of Aspergillus; Amano Pharmaceutical Co., Ltd.) in an amount of 1% based on the weight of the above substrate protein was dissolved in a small volume of water, and this solution was put into a sterile conical flask through a small germfree filter. It was added germfree to the milk-serum protein solution placed in the jar fermentor, and the mixture was held at 37° C. and at pH 7.5 with stirring. The progress of enzymatic reaction was traced, as described above, by measuring the change in the amount of amino compounds released (by the ninhydrin colorimetric method using glycine as the standard substance), and the reaction was terminated when 220 mg per gram of the substrate protein was released (five hours after the start of reaction). SDS-polyacrylamide gel electrophoresis demonstrated that this is the optimum end point for selective degradation of β-Lg.

The reaction mixture was spray-dried, giving 49 g of milk-serum protein with diminished β-Lg in which 83% of the β-Lg fraction had been degraded into low-molecular products.

EXAMPLE 2

To five liters of a 1% solution of cow's milk-serum protein prepared and placed in a jar fermentor in the same manner as in Example 1, was added a germfree aqueous solution of Neutrase (a neutral protease derived from *Bacillus subtilis*; Novo Inc.) in an amount of 1% by weight based on the weight of the above substrate protein, and the mixture was held at 40° C. and at pH 7.0 with stirring. The progress of enzymatic reaction was traced in the same way as above, and the reaction was terminated when 220 mg per gram of the substrate protein was released (four hours after the start of reaction). The reaction mixture was spray-dried, giving 47 g of milk-serum protein with diminished β-Lg in which 80% of β-Lg had been degraded.

EXAMPLE 3

To five liters of a 1% solution of cow's milk-serum protein prepared and placed in a jar fermentor in the same manner as in Examples 1 and 2, was added a germfree aqueous solution of trypsin in an amount of 1% by weight based on the weight of the above substrate protein, the mixture was held at 37° C. and at pH 7.5 with stirring, and the reaction was terminated when 120 mg per gram of the substrate protein was released (four hours after the start of reaction). The reaction mixture was spray-dried, giving 48 g of milk-serum protein with diminished β-Lg in which 87% of β-Lg had been degraded.

EXAMPLE 4

A mixture of 1.84 kg cow's milk-serum protein concentrate 76 (protein: 1.398 kg) and 6.63 kg cow's milk-serum protein concentrate 35 (protein: 2.231 kg) was dissolved in water, preparing 74.38 kg of a 5% aqueous solution of protein.

This solution was adjusted to pH 8.0 by addition of 10% sodium hydroxide solution, $1.2 \times 10^8$ BAEE units of bovine trypsin (T-8003; Sigma Inc.) was then added, and the resulting mixture was held at 37° C. for 90 minutes at pH 8.0 with stirring to effect the enzymatic reaction.

Figure 5:
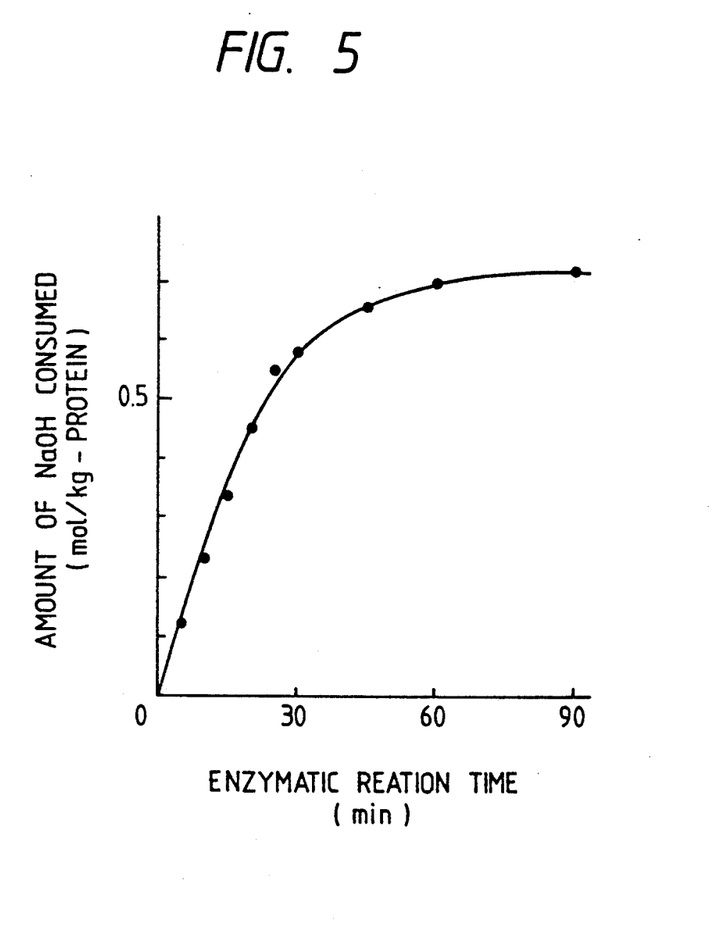
FIG. 5 is a degradation curve observed when milk serum is treated with bovine trypsin for 0 to 90 minutes (Example 4).

The amount of sodium hydroxide consumed was measured throughout the whole course of reaction, the result of which is shown in FIG. 5. As can be seen from the figure, the reaction was put almost to completion in 90 minutes.

Figure 6:
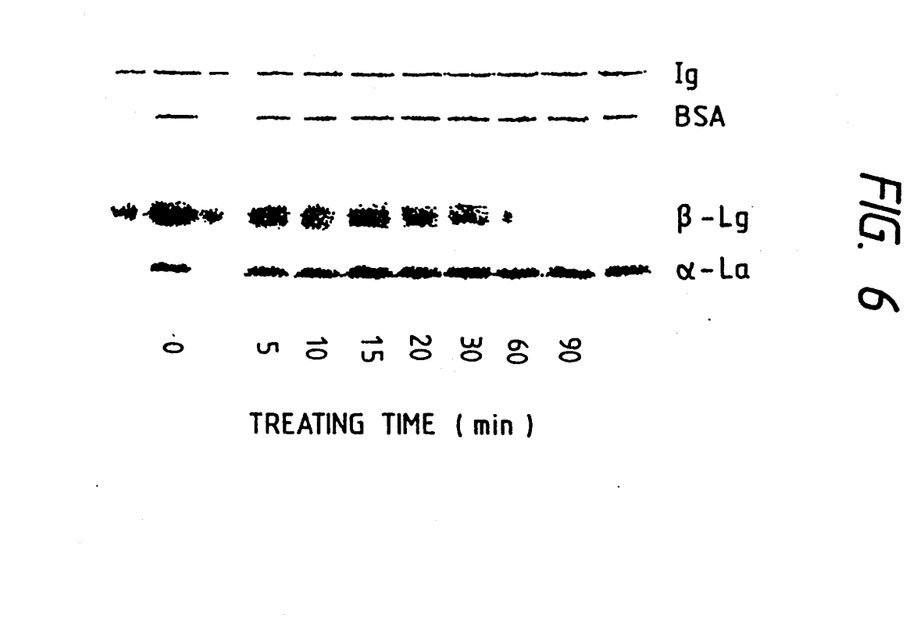
FIG. 6 shows SDS-polyacrylamide gel electrophoretic patterns of milk-serum protein during degradation (Example 4).

The reaction mixture was analyzed by SDS-polyacrylamide gel electrophoresis, the result of which is shown in FIG. 6. It is apparent from the figure that selective degradation of β-Lg was achieved 60 minutes after the start of reaction.

EXAMPLE 5

One liter of a 0.5 wt % aqueous solution of ioslated cow's milk-serum protein was adjusted to pH 8.0 by addition of 1N sodium hydroxide: bovine trypsin (T-8003; Sigma Inc.) was then added in an amount of $2.5 \times 10^4$ BAEE unit/g of the isolated cow's milk-serum protein, and the reaction was carried out at 37° C. and at pH 8.0 for two hours with stirring. The reaction mixture and unreacted mixture (both 20 μl) were each subjected to HPLC (high performance liquid chromatography) under the following conditions:

| Column: | TSK G2000 SWXL (Tosoh Corp.) |
|---|---|
| Mobile phase: | 50 mM sodium phosphate buffer containing 0.1M sodium sulfate (pH 6.8) |
| Flow rate: | 1 ml/min |
| Detection: | UV absorption (λ = 280 nm) |
| Sample concentration: | 0.5% for the isolated cow's milk-serum protein; 0.45% as whey protein |
| Sample volume: | 20 μl |
| Column temperature: | 25° C. |

Figure 7A:
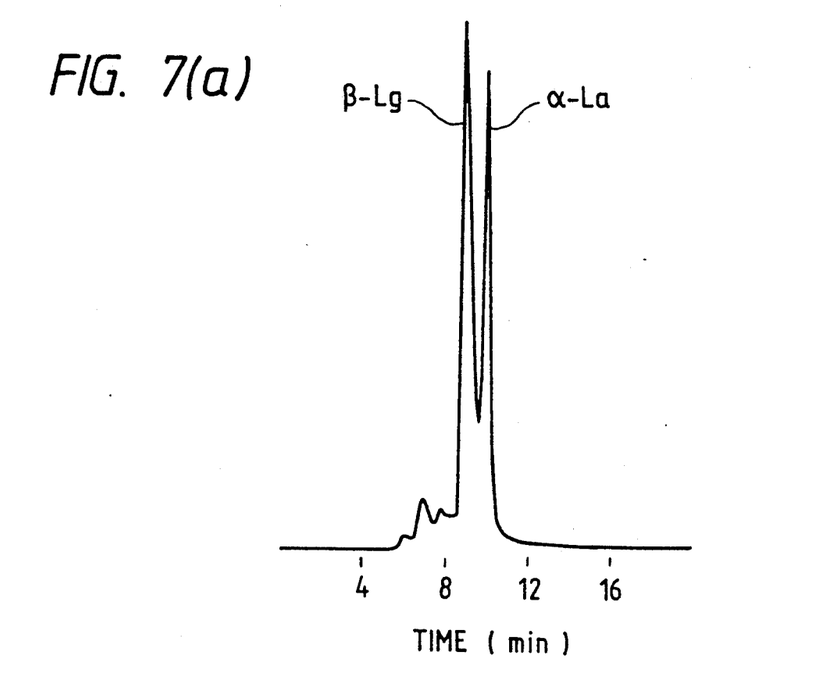
FIG. 7 shows HPLC patterns of the reaction mixture and unreacted mixture in Example 5 [(a): unreacted mixture; (b): reaction mixture].
Figure 7B:
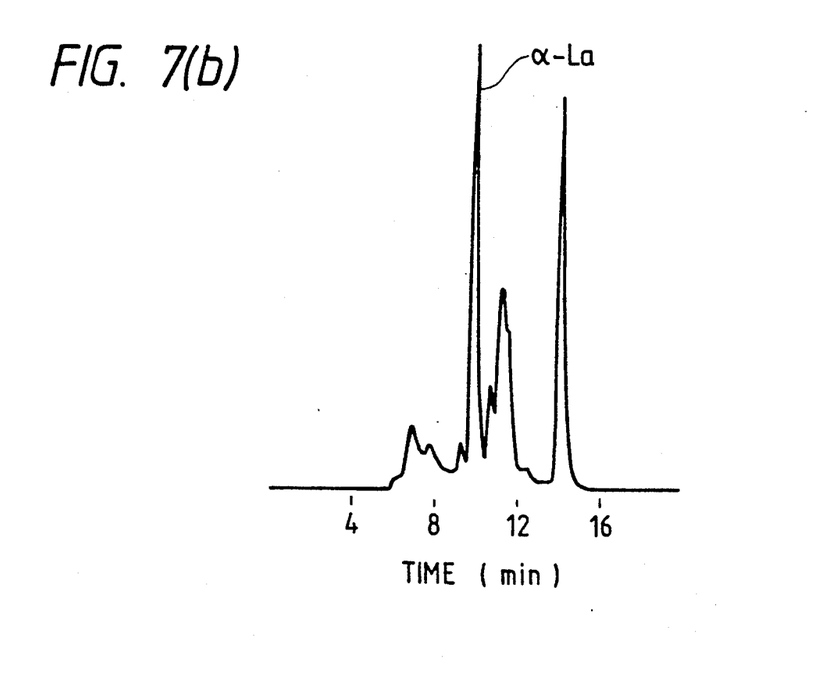

Chromatograms obtained are shown in FIG. 7 [(a): unreacted mixture; (b): reaction mixture]. As can be seen from the figure, β-Lg was selectively degraded completely by treatment with bovine trypsin (T-8003; Sigma Inc.) for two hours.

EXAMPLE 6

PCA reaction (I. Mota and D. Wong, 1969, Life Science, 8, 813) was used in this experiment to confirm (1) selective degradation of β-Lg and (2) survival of α-lactalbumin (referred to as α-La hereinafter) after the antigen-antibody reaction.

1. Preparation of protein-containing samples

One liter of a 1 wt % aqueous solution of isolated cow's milk-serum protein was adjusted to pH 8.0 by addition of 1N sodium hydroxide bovine trypsin (T-8003; Sigma Inc.) was then added in an amount of $10^4$ BAEE unit/100 mg of the isolated cow's milk-serum protein, and the reaction was carried out at 37° C. and at pH 8.0 for two hours with stirring. The reaction mixture thus obtained and the unreacted mixture were used as protein-containing samples.

2. Passive cutaneous anaphylaxis (PCA)

Male rats of 7-week age with the back hairs shaved off were used as test animals.

Separately, mouse anti-β-Lg serum and mouse anti-α-La serum were each diluted with 10 mM sodium phosphate buffer containing 0.15M sodium chloride (phosphate-buffered saline: PBS), preparing doubling dilutions (1/10, 1/20, 1/40, 1/80) for both. Each of the dilutions (50 μl) thus prepared was intradermally injected to the back of a rat, and the rat was thus passively sensitized for 24±2 hours. 1% Evans' Blue solution (0.5 ml) containing the protein-containing sample (protein content: 1 mg) prepared above was then injected at the caudal vein, the rat was killed 30 minutes later, and bluing spots were observed after peeling off the back skin. The result is summarized in FIGS. 8 and 9 (FIG. 8: unreacted mixture; FIG. 9: reaction mixture).

Figure 8:
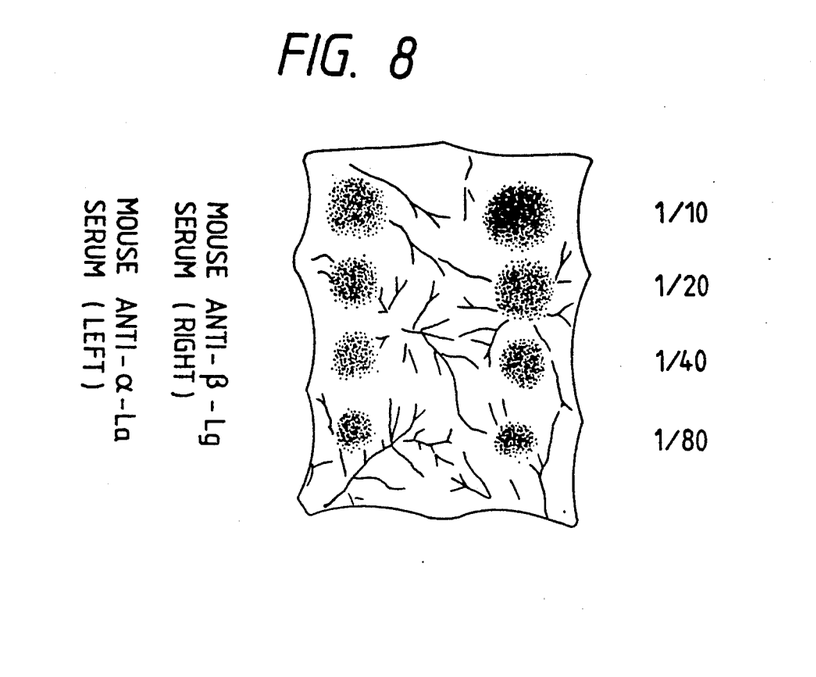
FIGS. 8 and 9 show bluing spots developed on the back skin of rats by the PCA test using the reaction mixture and unreacted mixture in Example 6 (FIG. 8: unreacted mixture.
Figure 9:
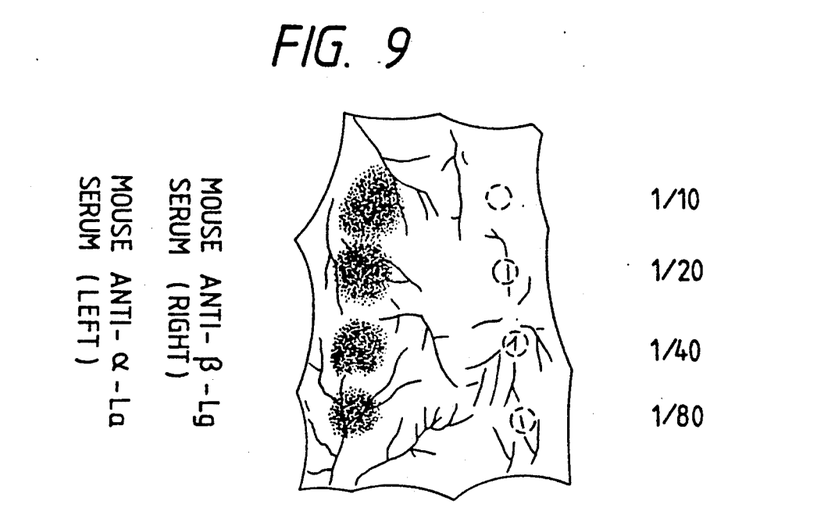

FIG. 8 indicates that the unreacted mixture contains both α-La and β-Lg in large amounts, and FIG. 9 shows that the reaction mixture contains a large amount of α-La and only a small amount of β-Lg left undegraded.

EXAMPLE 7

The neutralization PCA method was used in this experiment to confirm (1) selective degradation of β-Lg and (2) survival of α-La after the antigen-antibody reaction.

1. Preparation of protein-containing samples

The reaction mixture and the unreacted mixture prepared in the same way as in Example 6 were used as protein-containing samples.

2. Neutralization PCA method

Male rats of 7-week age with the back hairs shaved off were used as test animals.

Figure 10:
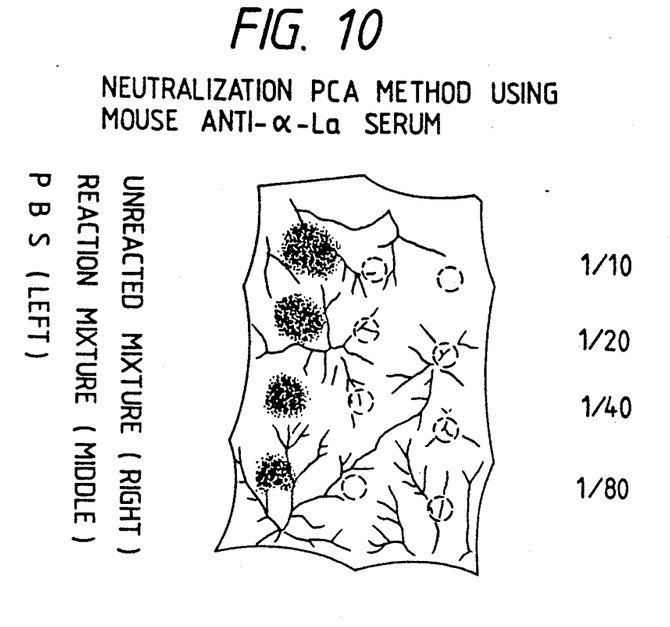
FIG. 10 shows bluing spots developed on the back skin of rats by the neutralization PCA test (Example 7), in which mouse anti-α-La serum is added to each of the reaction mixture, the unreacted mixture and PBS (Phosphate Buffered Saline), and the neutralized solutions thus obtained are intradermally injected to the back of rats, followed by intravenous injection of α-La after 24 hr. sensitization period.

Separately, each of the samples containing 200 μg whey protein or PBS was mixed with an equal volume of mouse anti-β-Lg serum or mouse anti-α-La serum, the mixture was held at 25° C. for two hours to effect neutralization, and the neutralized solution was diluted to prepare doubling dilutions (1/10, 1/20, 1/40, 1/80). Each of the dilutions (50 μl) thus prepared was intradermally injected to the back of a rat, and the rat was thus passively sensitized for 24±2 hours. 1% Evans' Blue solution (0.5 ml) containing 1 mg of β-Lg or α-La was then injected at the caudal vein, the rat was killed 30 minutes later, and bluing spots were observed after peeling off the back skin. The result is summarized in FIGS. 10 and 11. FIG. 10 is the result of neutralization with mouse anti-α-La followed by the antigen-antibody reaction with α-La, while FIG. 11 is the result of neutralization with mouse anti-β-Lg followed by the antigen-antibody reaction with β-Lg.

Figure 11:
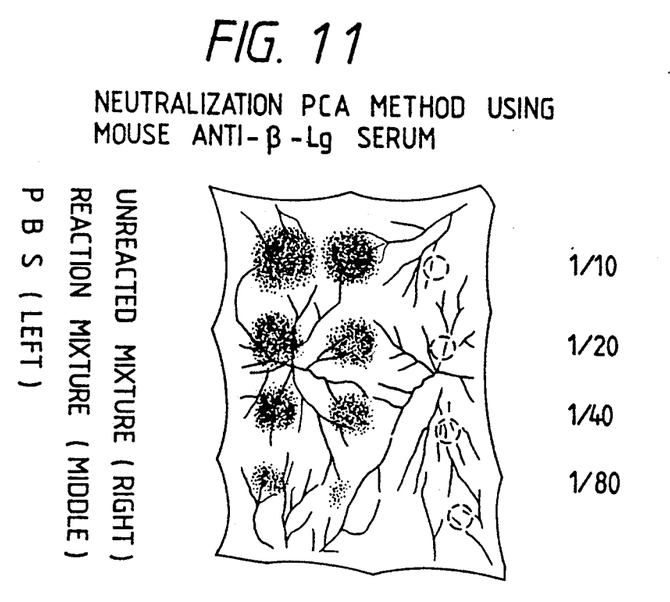
FIG. 11 shows bluing spots developed on the back skin of rats by the neutralization PCA test (Example 7), in which mouse anti-β-Lg serum is added to each of the reaction mixture, the unreacted mixture and PBS, and the neutralized solutions thus obtained are intradermally injected to the back of rats, followed by intravenous injection of β-Lg after 24 hr. sensitization period.

FIG. 10 indicates that a large amount of α-La is contained in both the reaction mixture and unreacted mixture, and FIG. 11 shows that little β-Lg is scarcely contained in the reaction mixture.

EFFECTS ACHIEVED BY THE INVENTION

In the method of this invention, milk-serum protein components other than β-Lg(e.g., α-La, immunoglobulins and cow's serum albumin) are scarcely degraded, with only β-Lg being selectively degraded into low-molecular polypeptides having no allergenic action and showing no disagreeable taste, such as bitterness. The final product retains the emulsifying property of the original milk because the protein components other than β-Lg are left undegraded, and is more easily digested and absorbed when taken in orally because indigestible β-Lg has been already degraded. With these advantages, the product obtained by the method of this invention is of great value as a food material for infant nursing.

What is claimed is:

1. A method of selectively degrading β-lactoglobulin in cow's milk-serum protein while not substantially degrading other milk proteins, comprising adding a protease of microbial origin to an aqueous solution of cow's milk-serum protein, and carrying out an enzymatic reaction in the presence of said protease and the substantial absence of any non-microbial protease at a temperature between about 30° C. and 40° C. for a time of 0.5 to 20 hours at a pH in the range of 7 to 9;

continuing said enzymatic reaction until the degradation of the β-lactoglobulin is essentially complete; and discontinuing said enzymatic reaction prior to the time that substantial degradation of other milk proteins commences.

2. A method according to claim 1 wherein said degradation of β-lactoglobulin continues to an extent corresponding to a release of amino compounds, soluble in 10% trichloroacetic acid, which reaches an amount ranging from about 120 to about 220 milligrams of glycine per gram of substrate protein.

3. A method according to claim 1 wherein said protease of microbial origin is derived from a microorganism selected from the group consisting of Aspergillus, *Bacillus subtilis* and actinomyces.

4. A method according to claim 3 wherein said degradation of β-lactoglobulin continues to an extent corresponding to a release of amino compounds, soluble in 10% trichloroacetic acid, which reaches an amount of about 120 milligrams of glycine per gram of substrate protein.

5. A method of selectively degrading β-lactoglobulin in cow's milk-serum protein while not substantially degrading other milk proteins, comprising adding a protease of microbial origin to an aqueous solution of cow's milk-serum protein, and carrying out an enzymatic reaction in the presence of said protease and the absence of non-microbial protease at a temperature between about 30° C. and 40° C. for a time of 0.5 to 20 hours at a pH in the range of 7 to 9;

continuing said enzymatic reaction until the degradation of the β-lactoglobulin is essentially complete; and discontinuing said enzymatic reaction prior to the time that substantial degradation of other milk proteins commences.

* * * * *